(12) United States Patent
Levari et al.

(10) Patent No.: US 12,580,933 B2
(45) Date of Patent: Mar. 17, 2026

(54) CORRELATING FIREWALL AND ZERO TRUST DATA TO MONITOR REMOTE AND HYBRID WORKER SESSIONS

(71) Applicant: Cisco Technology, Inc., San Jose, CA (US)

(72) Inventors: Doron Levari, Newton, MA (US); Vincent E. Parla, North Hampton, NH (US); Tariq Ahmed Farhan, Cambridge, MA (US); Siddhu Warrier, London (GB); Jason M Perry, Plymouth, MA (US)

(73) Assignee: Cisco Technology, Inc., San Jose, CA (US)

( * ) Notice: Subject to any disclaimer, the term of this patent is extended or adjusted under 35 U.S.C. 154(b) by 334 days.

(21) Appl. No.: 18/175,218

(22) Filed: Feb. 27, 2023

(65) Prior Publication Data

US 2024/0291837 A1 Aug. 29, 2024

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC .................... H04L 63/1425; H04L 63/1416
See application file for complete search history.

(56) References Cited

U.S. PATENT DOCUMENTS

| | | | | |
|---|---|---|---|---|
| 8,914,406 B1* | 12/2014 | Haugsnes | ........... | G06F 9/45558 |
| | | | | 710/316 |
| 9,038,170 B2* | 5/2015 | Joshi | ........................ | G06F 21/62 |
| | | | | 713/153 |
| 9,137,258 B2* | 9/2015 | Haugsnes | ............... | G06F 16/24 |
| 9,369,433 B1* | 6/2016 | Paul | ...................... | H04L 63/029 |
| 10,348,767 B1* | 7/2019 | Lee | ......................... | H04L 67/10 |
| 11,075,923 B1* | 7/2021 | Srinivasan | ............ | H04L 63/108 |
| 11,777,935 B2* | 10/2023 | Gandhi | ................ | H04W 12/04 |
| 2007/0150934 A1* | 6/2007 | Fiszman | ............... | H04L 63/102 |
| | | | | 726/1 |
| 2007/0256122 A1 | 11/2007 | Foo et al. | | |
| 2015/0180894 A1* | 6/2015 | Sadovsky | ............. | H04W 12/12 |
| | | | | 726/22 |
| 2017/0339176 A1* | 11/2017 | Backer | ................ | H04L 63/1425 |
| 2017/0353483 A1* | 12/2017 | Weith | ...................... | G06F 16/23 |
| 2019/0089677 A1* | 3/2019 | Ashley | ............... | H04L 63/0263 |
| 2019/0173908 A1 | 6/2019 | Couturier et al. | | |
| 2019/0373008 A1 | 12/2019 | Brandwine et al. | | |
| 2020/0228557 A1 | 7/2020 | Lin et al. | | |
| 2021/0367920 A1* | 11/2021 | Devarajan | ............ | H04L 63/166 |
| 2021/0400088 A1 | 12/2021 | Luger | | |

(Continued)

*Primary Examiner* — Michael R Vaughan
(74) *Attorney, Agent, or Firm* — Lee & Hayes, P.C.

(57) ABSTRACT

Security, access and the way organizations communicate with their employees, contractors and customers is evolving faster than ever, and as the world is becoming more hybrid, security policies, monitoring and control must become collaborative and interoperable. The techniques described herein provide meaningful correlation and analytics of data coming from multiple sources in the network, access, security and identity, thereby improving troubleshooting, optimizations, threat forensics and analysis, as well as enabling network administrators more control over network policies.

16 Claims, 6 Drawing Sheets

(56) References Cited

U.S. PATENT DOCUMENTS

| | | | | |
|---|---|---|---|---|
| 2022/0027431 A1* | 1/2022 | Zheng | ................... | H04L 43/045 |
| 2022/0078090 A1* | 3/2022 | Sinha | ..................... | H04L 43/10 |
| 2022/0376998 A1* | 11/2022 | Vasseur | .............. | H04L 41/5067 |
| 2023/0095870 A1* | 3/2023 | Du | ..................... | H04L 63/1425 |
| | | | | 726/23 |
| 2023/0164116 A1* | 5/2023 | Devarajan | .......... | H04L 63/0254 |
| | | | | 726/13 |
| 2024/0121211 A1* | 4/2024 | Bhatia | ................ | H04L 63/0272 |

* cited by examiner

200

| PROCESSOR(S) 202 | NETWORK INTERFACE(S) 204 |
|---|---|

MEMORY 206

| NETWORK SERVICE FUNCTIONS 208 | NETWORK ORCHESTRATION FUNCTIONS 210 |
|---|---|
| SERVICE MANAGEMENT FUNCTIONS 212 | APPLICATION PROGRAMMING INTERFACES (APIs) 214 |
| COLLECTION MODULE 216 | CORRELATION MODULE 218 |
| MONITORING MODULE 220 | ACTION MODULE 222 |

DATA STORE 224

| COMMUNICATION LIBRARIES 226 | NETWORK TOPOLOGY 228 | POLICIES 230 | DATA 232 |
|---|---|---|---|

CONTROLLER 118

300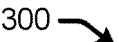

RECEIVE A REQUEST TO INITIATE SESSION(S) ASSOCIATED WITH A USER OF A
NETWORK
302

COLLECT FIRST DATA ASSOCIATED WITH THE SESSION(S), THE FIRST DATA
INCLUDING IDENTIFIER(S)
304

CORRELATE THE IDENTIFIER(S) WITH SECOND DATA STORED IN A DATABASE
306

RECEIVE AN INDICATION OF A NETWORK EVENT, THE INDICATION INCLUDING AN
IDENTIFIER OF THE IDENTIFIER(S)
308

ACCESS, BASED AT LEAST IN PART ON THE IDENTIFIER, THIRD DATA
310

PERFORM AN ACTION ASSOCIATED WITH THE NETWORK EVENT
312

CORRELATING FIREWALL AND ZERO TRUST DATA TO MONITOR REMOTE AND HYBRID WORKER SESSIONS

TECHNICAL FIELD

The present disclosure relates generally to the field of computer networking, and more particularly to improving troubleshooting, optimizations, threat forensics and analysis within a remote/hybrid network structure.

BACKGROUND

Cloud-based service provider networks, often described as 'hyperscalers', offer cloud-based services to fulfill users' computing-service needs without the users having to invest in and maintain computing infrastructure required to implement the services. For example, cloud service providers may operate networks of data centers housing significant numbers of interconnected computing systems, such as public data centers, that are configured by the service provider to provide cloud-based services to customers (e.g., an organization that is purchasing the service) and/or users of the customer (e.g., employees of the organization, partners of the organization, visitors, etc.). These service provider networks may provide network-based computing resources on an as-needed basis. For example, a service provider network may permit customers to purchase and enable users of the customer to utilize computing resources such as virtual machine ("VM") instances, compute resources, data storage resources, database resources, networking resources, network services, and other types of computing resources. Network administrators may configure the computing resources provided by a service provider network to implement desired functionality, such as to provide a network-based application or another type of functionality to an enterprise of users. While hyperscaler-based datacenters are growing in popularity, traditional enterprise-managed datacenters are still widely used. The combination of these deployments is usually described as 'hybrid' datacenters. Generally, remote users are able to connect to these network-based applications and/or enterprise functionalities using virtual private network (VPN) or proxy-based (ZTN) solutions.

In light of the recent pandemic, and the consequent change in corporate working patterns, more and more employees, contractors are partners spend at least part of their time working remotely from home in either a fully remote or hybrid work environment. This has resulted in the dissolution of the traditional corporate perimeter and placed additional burdens on security professionals who need to monitor network access patterns.

Further, as more and more companies take a "best of breed" approach to designing remote access capabilities for their customers, users (e.g., employees, etc.) can typically access internal resources with the corporate perimeter using a variety of mechanisms—for example, using modern Zero Trust Network Access (ZTNA) solutions, traditional Remote Access Virtual Private Network (RA VPN) connections, and firewalls that scan Zero Trust traffic, all of which are integrated with an Identity Provider (IdP) that uses multifactor authentication.

As a result, network administrators now need to monitor, correlate, and analyze events and sessions from a multitude of different sources to perform actions such as troubleshooting, monitoring, and threat forensics on the network. However, current security monitoring products lack the capability to monitor, correlate, and analyze events from multiple streams of information.

For instance, Security Information and Event Management (SIEM) systems gather information and events from multiple sources, but they are not capable of correlating them in an intelligent fashion. However, SIEM systems correlate events only by timestamp. Thus, with small time differences between the components on the packet chain, the "chain of experience" for a session of a remote and/or hybrid worker can break, or, even when the system does find the right pieces it fails to order them correctly, and logically paint the right picture of the remote/hybrid worker session.

Accordingly, there is a need for a single way to access streams of information and correlate them, such that a system can understand both the syntax and semantics of remote and/or hybrid user sessions within a network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for improving troubleshooting, optimizations, threat forensics and analysis within a remote/hybrid network structure associated with the system described in FIGS. 1 and 2.

DESCRIPTION OF EXAMPLE EMBODIMENTS

Overview

Figure 1A:
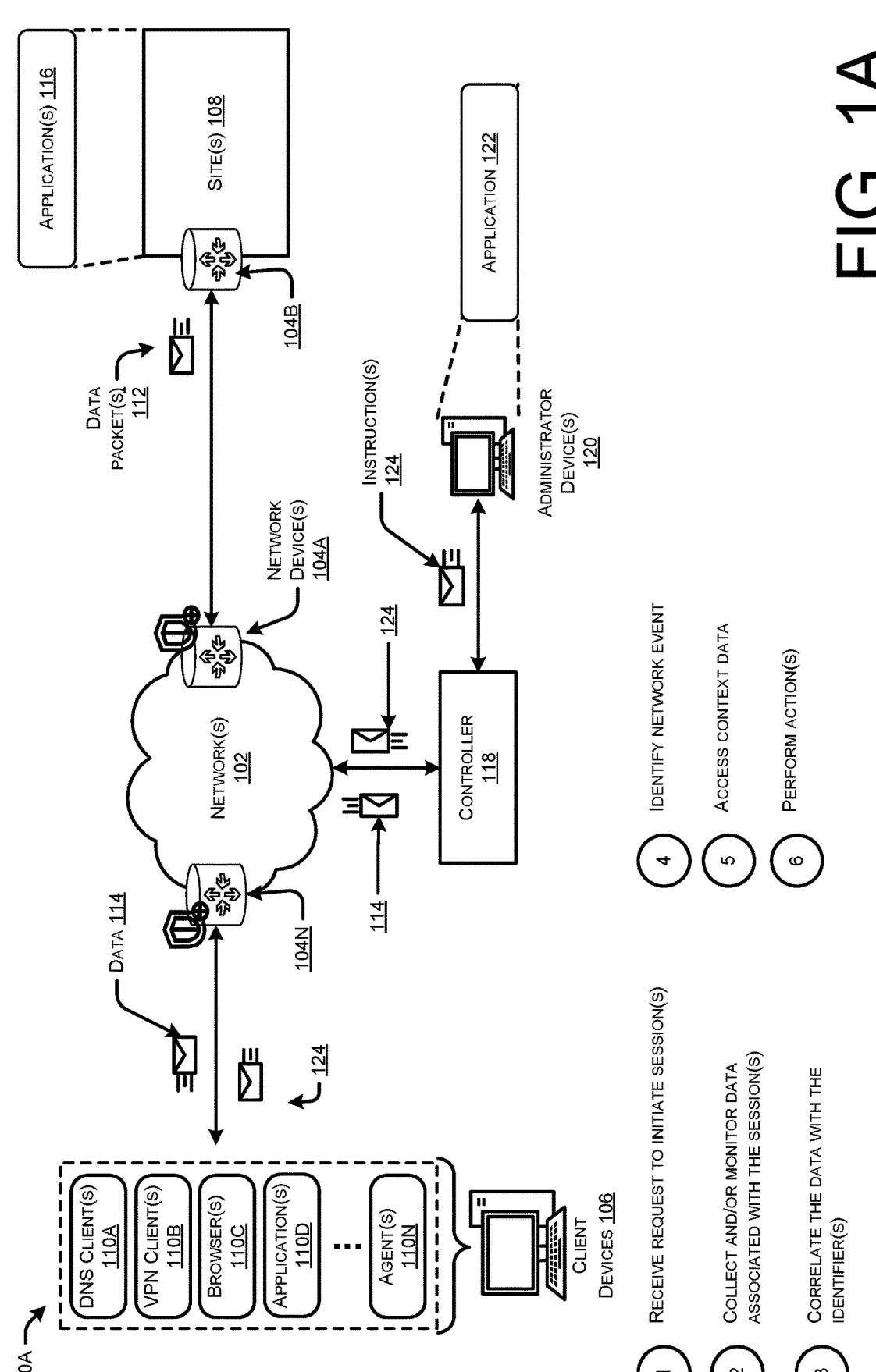
FIG. 1A illustrates a system-architecture diagram of an environment in which a system can provide integrated correlation between multiple streams of data in a remote/hybrid environment.

The present disclosure relates generally to the field of computer networking, and more particularly to improving troubleshooting, optimizations, threat forensics and analysis within a remote/hybrid network structure.

A method to perform the techniques described herein may include receiving, from a device within a network, a request to initiate one or more sessions associated with a user of the network. The method may include collecting, based at least in part on the request, first data associated with the one or more sessions, the first data including one or more identifiers. The method may also include correlating the identifier(s) with second data stored in a database of the network.

Further, the method may include receiving an indication of a network event, the indication including an identifier of the one or more identifiers. The method may include accessing, based at least in part on the identifier, third data. The method may also include performing, based at least in part on the third data, an action associated with the network event.

An additional method to perform the techniques described herein may include sending, from a device within a network, a request for an application to access a service associated with the network. The method may also include receiving, by the device, access to the service. Additionally, the method may include sending from the device, a second request to access a second application associated with the service. The method may include receiving, by the device, an instruction associated with a policy of the device. Further, the method may include updating the policy of the device based at least in part on the instruction.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

Cloud-based service provider networks, often described as 'hyperscalers', offer cloud-based services to fulfill users' computing-service needs without the users having to invest in and maintain computing infrastructure required to implement the services. For example, cloud service providers may operate networks of data centers housing significant numbers of interconnected computing systems, such as public data centers, that are configured by the service provider to provide cloud-based services to customers (e.g., an organization that is purchasing the service) and/or users of the customer (e.g., employees of the organization, partners of the organization, visitors, etc.). These service provider networks may provide network-based computing resources on an as-needed basis. For example, a service provider network may permit customers to purchase and enable users of the customer to utilize computing resources such as virtual machine ("VM") instances, compute resources, data storage resources, database resources, networking resources, network services, and other types of computing resources. Network administrators may configure the computing resources provided by a service provider network to implement desired functionality, such as to provide a network-based application or another type of functionality to an enterprise of users. While hyperscaler-based datacenters are growing in popularity, traditional enterprise-managed data-centers are still widely used. The combination of these deployments is usually described as 'hybrid' datacenters. Generally, remote users are able to connect to these network-based applications and/or enterprise functionalities using virtual private network (VPN) or proxy-based (ZTN) solutions.

In light of the recent pandemic, and the consequent change in corporate working patterns, more and more employees, contractors are partners spend at least part of their time working remotely from home in either a fully remote or hybrid work environment. This has resulted in the dissolution of the traditional corporate perimeter and placed additional burdens on security professionals who need to monitor network access patterns.

Further, as more and more companies take a "best of breed" approach to designing remote access capabilities for their customers, users (e.g., employees, etc.) can typically access internal resources with the corporate perimeter using a variety of mechanisms—for example, using modern Zero Trust Network Access (ZTNA) solutions, traditional Remote Access Virtual Private Network (RA VPN) connections, and firewalls that scan Zero Trust traffic, all of which are integrated with an Identity Provider (IdP) that uses multi-factor authentication.

As a result, network administrators now need to monitor, correlate, and analyze events and sessions from a multitude of different sources to perform actions such as troubleshooting, monitoring, and threat forensics on the network. However, current security monitoring products lack the capability to monitor, correlate, and analyze events from multiple streams of information.

For instance, Security Information and Event Management (SIEM) systems gather information and events from multiple sources, but they are not capable of correlating them in an intelligent fashion. However, SIEM systems correlate events only by timestamp. Thus, with small time differences between the components on the packet chain, the "chain of experience" for a session of a remote and/or hybrid worker can break, or, even when the system does find the right pieces it fails to order them correctly, and logically paint the right picture of the remote/hybrid worker session.

Accordingly, there is a need for a single way to access streams of information and correlate them, such that a system can understand both the syntax and semantics of remote and/or hybrid user sessions within a network.

This disclosure describes techniques and mechanisms for a system to provide integrated correlation between multiple streams of data in a remote/hybrid environment. In some examples, the system may receive, from a device within a network, a request to initiate one or more sessions associated with a user of the network. The system may collect, based at least in part on the request, first data associated with the one or more sessions, the first data including one or more identifiers. In some examples, the system may correlate the identifier(s) with second data stored in a database of the network. The system may receive an indication of a network event, the indication including an identifier of the one or more identifiers. Additionally, the system may access, based at least in part on the identifier, third data. Further, the system may perform, based at least in part on the third data, an action associated with the network event.

Additionally or alternatively, the system may send, from a device within a network, a request for an application to access a service associated with the network. The system may receive, by the device, access to the service. In some examples, the system may send from the device, a second request to access an application associated with the service. The system may also receive, by the device, an instruction associated with a policy of the device. In some examples, the system may update the policy of the device based at least in part on the instruction.

In some examples, the system may comprise a collection module. In some examples, the system may collect data and/or metadata associated with network traffic, session(s), Firewall packets, Remote Access Virtual Private Network (RA VPN) and Zero Trust Network Access (ZTNA) sessions, Security Assertion Markup Language (SAML) Authentication and Multi-factor Authentication (MFA)

events, as well as data from multiple products and disciplines in their own realms and languages.

In some examples, the system may comprise a correlation module. In some examples, the correlation module may extract events and data points to create a "session map" (e.g., an end-to-end understanding of the entire session starting from the user on his Personal Computer (PC), laptop or mobile device all the way to the application in the corporate datacenter). In some examples, the correlation module may access the data collected by the collection module and may to track a packet from the source (e.g., a client device), through VPN termination, possible Network Address Translation (NAT) translations, Intrusion Prevention System (IPS) scans, and any other hops on the network, to the final destination. For instance, in this example, the correlation module may correlate the packet with each "stage" of transmission using native components of the transmission, such as IP address, MAC address, identity or session characteristics. In some examples, the correlation module may correlate the data packet with one or more of a username, IP address, MAC address, etc. that is associated with a user and/or the client device.

In some examples, the correlation module may operate in real time. For instance, the digital identity associated with a session and/or user (e.g., username, IP address, MAC address, any information that may be helpful to may correlation between the data packet and the user easier, etc. that is correlated with a session and/or stage of a session) may be injected into a header of a data packet in real time. In some examples, the data packet may comprise a NetFlow data packet. In some examples, the correlation module may place a small piece of metadata (e.g., an identifier, SGT tags, etc.) into an IP6 option, new header, etc. In this example, the identifier can be a key into larger chunk of metadata. Accordingly, the correlation module may add a mapping value into the header of a data packet that can be looked up in key/value store of the system that is correlated with a particular identifier of a user and/or session (e.g., username, IP address, MAC address, timestamps, locations, etc.). Accordingly, the system may inject metadata into packet headers to make it easier for the system to correlate the data packet and the source (e.g., client device).

In some examples, the correlation module may operate in correlation time. In some examples, correlation time may correspond to an event time. In some examples, correlation time corresponds to storing and maintaining a map between the IP address of a particular "digital identity" and a username associated with a user of the client device. In this example, the system may be configured to understand how IP addresses are translated and how identities are translated within the network. Accordingly, data packet(s) and/or sessions flowing from a particular network device and/or firewall, may always include a particular IP address. In this example, the data packets associated with an event and/or pipelines may be routed to go through the correlation module, so the event is enriched with the "digital identity" of that packet flowing by from a first IP address to a second IP address.

In some examples, the system may comprise a monitoring module. In some examples, the monitoring module is configured to actively and/or passively monitor data received by the collection module and correlation module. In some examples, the monitoring module may detect network event(s) that occur within the network and/or receive indication(s) of network event(s) from network device(s), firewall(s), etc., within the network. For instance, when a network event is identified and/or received, the monitoring module may perform an analysis. As an example, the monitoring module may detect a remote worker trying to access and/or download malware. In some examples, the monitoring module may receive an indication of the event that looks like "IP 1.1.1.1 accessed 20.20.20.20, 20.20.20.20 is bad". In this example, the monitoring module may begin an analysis, to track the 1.1.1.1 source IP address and determine remote access data (e.g., who had it on that exact time, whether the IP address is dynamic and/or reused, whether the IP address is converted (e.g., AKA NAT, Network Address Translation), timestamps, username, etc. Accordingly, the monitoring module may perform forensics and analysis on the enriched data to determine the username of the user, whether the user is compromised (e.g., had password stolen from phishing scan, etc.), whether the network is compromised, etc. In some examples, the monitoring module may send an indication to the action module to generate an alert for a network administrator.

In some examples, the system may comprise an action module. In some examples, the action module may have access to one or more network policies associated with the network. In some examples, the action module may generate and send notification(s) and/or alert(s) to a network administrator in response to detecting a network event. In some examples, the notification(s) and/or alert(s) may comprise indication(s) of the digital identity of the user (e.g., username, context data, indication of compromise, etc.). In some examples, the action module may receive instructions from the network administrator. In some examples, the action module may send instructions, automatically and/or in response to receiving the instructions from the network administrator, to one or more network device(s), firewalls, etc. within the network. In some examples, the instructions may instruct the network device, firewall, etc., to block a connection, update a policy, and/or reconfigure a policy. In some examples, the instruction(s) may be based on accessing context data stored in a database that is correlated (e.g., mapped) to the identity of a user.

In some examples, the action module may send the context data to the firewall. In this example, the firewall may utilize the context data, such that it is no longer blind to context of the communication or packet from a particular user. For example, a Next-Gen Firewall (NGFW) may receive a request to access an application (e.g., such as Facebook) from a remote client device. In this example, the NGFW may receive the digital identity of the user via the request and/or context data from the action module. Accordingly, the NGFW may no longer be blind to permissions associated with the digital identity and may automatically block or allow the connection to Facebook based on the digital identity and/or context data of the user. For instance, where the digital identity indicates the user is associated with a marketing group of a corporation, the NGFW may allow access to the application. However, if the digital identity and/or context data indicates that the user is associated with an engineering group, the NGFW may block the connection to the application.

In this way, the system may identify, contextualize, and correlate multiple sources of remote access information from source to destination for anomaly detection, threat forensics, troubleshooting, and optimizations. Accordingly, the described techniques may access multiple sources of remote access information natively, and use it to extract events and data points to create a "session map" (e.g., an end-to-end understanding of the entire session starting from the user on his Personal Computer (PC), laptop or mobile device all the way to the application in the corporate datacenter). Thus, the described techniques may provide meaningful correlation and analytics of data coming from multiple sources in a network, thereby providing interoperability between stream of information within a remote/hybrid network structure. Moreover, network administrators are provided with greater control and flexibility when configuring network policies, such that customized policies for different departments may be defined based on digital identity of user(s) and/or context data.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an environment in which a system 100A can provide integrated correlation between multiple streams of data in a remote/hybrid environment. While the system 100A shows an example controller 118, it is understood that any of the components of the system may be implemented on any device in the network 102.

In some examples, the system 100A may include a network 102 that includes network devices 104. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), RA VPNs, VPNs, ZTNA, Wide Area Networks (WANs)—both centralized and/or distributed—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100A may comprise a controller 118. In some examples, the controller 118 corresponds to a system that has complete visibility into the security fabric of a given network (e.g., enterprise network, smaller network, etc.). In some examples, the controller 118 may comprise a network orchestrator, one or more processors, etc. In some examples, the controller 118 may be integrated as part of Cisco's Defense Orchestrator.

In some examples, a client device 106 may utilize one or more resources of a site 108 via one or more networks 102, such as, for example, the cloud network(s), by way of one or more process(es) 110, such as, for example, DNS client(s) 110A, VPN client(s) 110B, browser(s) 110C, application(s) 110D, and/or software agent(s) 110N executing on the client device 106.

The controller 118 may be configured to communicate with one or more network device(s) 104. For instance, as noted above the controller 118 may receive network data and/or session data (e.g., network traffic load data, network client data, etc.) or other data (e.g., application load data, data and/or metadata associated with WLCs, APs, etc.) from the network device(s) 104 that is associated with one or more session(s) of a user of the client device(s) 106. The network device(s) 104 may comprise routers, switches, access points, stations, radios, or any other network device. In some examples, the network device(s) 104 may monitor traffic flow(s) within the network and may report information associated with the traffic flow(s) to the controller 118.

In some examples, the system comprises site(s) 108. In some examples, the site(s) 108 comprise one or more server(s), enterprise network(s) and/or service(s) associated with a service provider, one or more network device(s) 104, etc. In some examples, the site(s) 108 correspond to one or more data center(s) comprising various network components, such as, for example, network switch(es) (also referred to as node(s)) operating on physical servers. In some examples, the site(s) 108 may comprise physical server(s) that may host one or more virtual machines. Each virtual machine may be configured to execute one of various operations and act as one or more virtual components for the cloud network(s) and/or enterprise/application network, such as, for example, the application(s) 116. In some examples, the physical server(s) may host any number of virtual machines. In some examples, the physical server(s) in the enterprise/application network may host the various network components of the enterprise/application network, such as, for example, the applications 116. In some examples, the client device(s) 106 comprise one or more user(s), mobile device(s), and/or Internet of Things (IOT) device(s) located at one or more locations.

In some examples, site(s) 108 communicate with each other, client device(s) 106, the controller 118, or cloud providers (e.g., SaaS, Internet, IaaS, etc.) via the network(s) 102.

In some examples, the network device(s) 104 may communicate information. For instance, the network device(s) 104 may send data packet(s) 112 associated with data flows and/or session(s) to other network device(s). In some examples, the data packet(s) 112 and/or metadata associated with the data packet(s) 112 may be sent to and/or monitored by the controller 118.

In some examples, the controller 118 may be configured to monitor the data packets 112. In some examples, the packets may comprise data and/or metadata (e.g., which application is used, by which station, traffic characteristics and duration, etc.) associated with network traffic and may store the data as part of the system and/or controller 118 (e.g., such as in a database and/or memory associated with the controller 118).

In some examples, administrator device(s) 120 may send instructions 124 to one or more site(s) and/or branches via the controller 118. In some examples, the instructions 124 may comprise instructions to block or allow access, instructions to configure a policy for the network, and/or instructions to re-configure or update a policy for the network. In some examples, the instructions may include policies associated with a single link in the network (e.g., firewall policy, IP address, etc.).

In some examples, the controller 118 may be configured to communicate with administrator device(s) 120. As illustrated, the administrator device(s) 120 may comprise an application 122. In some examples, the application 122 may correspond to an application provided by a service provider (e.g., such as Cisco) that enables an administrator of the network 102 to access the controller 118. For instance, the application 122 may correspond to Cisco's Defense Orchestrator.

At "1", the system may receive a request to initiation session(s). For instance, the system may receive a request from a client device that is located remotely from the network. The request may be to initiate a session (e.g., connect to a VPN, etc.) with a service of a network.

At "2", the system may collect and/or monitor data associated with the session(s). For instance, the system may collect data using the collection module described above. In some examples, the system may monitor the data using the monitoring module described above.

At "3", the system may correlate the data with identifier(s). For instance, the system may correlate the data with the identifiers via the correlation module described above.

At "4", the system may identify a network event. For instance, the system may identify a network event using the monitoring module described above. In some examples, the network event may be associated with a security risk or security breach within the network.

At "5", the system may access context data. For instance, the context data may be stored in a database or datastore associated with the system. The context data may comprise data associated with a user of a client device (e.g., name, company department, location data, role within the company, permission(s) associated with the network, etc.).

At "6", the system may perform action(s). For instance, the system may perform one or more action(s) using the action module described above.

In this way, the system may identify, contextualize, and correlate multiple sources of remote access information from source to destination for anomaly detection, threat forensics, troubleshooting, and optimizations. Accordingly, the described techniques may access multiple sources of remote access information natively, and use it to extract events and data points to create a "session map" (e.g., an end-to-end understanding of the entire session starting from the user on his Personal Computer (PC), laptop or mobile device all the way to the application in the corporate datacenter).

Figure 1B:
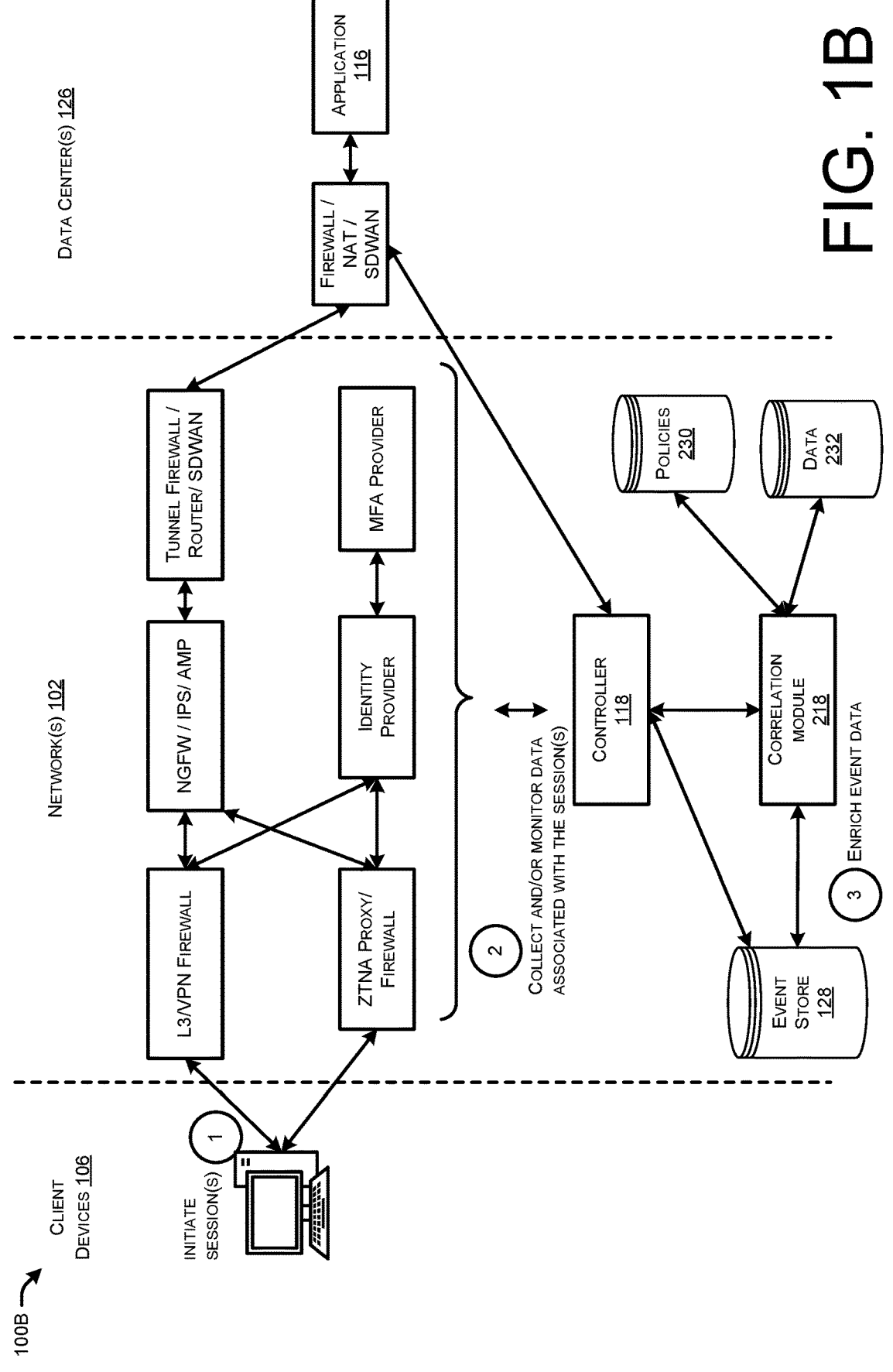
FIG. 1B illustrates a system-architecture diagram of an environment in which a system can provide integrated correlation between multiple streams of data in a remote/hybrid environment.

FIG. 1B illustrates a system-architecture diagram of an environment in which a system 100B can provide integrated correlation between multiple streams of data in a remote/hybrid environment. While the system 100B shows an example controller 118, it is understood that any of the components of the system may be implemented on any device in the network 102. In some examples, one or more components of the system 100B may be incorporated as part of system 100A described above.

As illustrated in FIG. 1B, the system 100B may include client device(s) 106, network(s) 102, application(s) 116, controller 118 as described above. The system may further include a correlation module 218, policies 230, and/or data 232, described in greater detail below with regard to FIG. 2.

The system may include a data center 126. In some examples, the data center 126 corresponds to the site(s) 108 described in FIG. 1A above. In some examples, the data center 126 may comprise various network components, such as, for example, firewall(s), NAT, SDWAN connection(s), and/or network switch(es) (also referred to as node(s)) operating on physical servers. As illustrated, the data center 126 may comprise application(s) 116 described above.

The system may include an event store 128. In some examples, the event store 128 may store event data associated with one or more network events. In some examples, the event store 128 may be included as part of the data store 224 described in FIG. 2 below. In some examples, the event data may be included as part of the data 232 described in greater detail below.

In some examples, the system 100B may illustrate an example of a path data packet(s) may take during one or more session(s) from a remote worker. As illustrated in FIG.

1B, the controller 118 may be configured to communicate with one or more components of the network 102 (e.g., one or more of the L3/VPN firewall, ZTNA proxy/firewall, NGFW/IPS/AMP, Identity Provider, Tunnel Firewall/Router/SDWAN, MFA firewall) and/or one or more components of the data center 126 (e.g., one or more of the firewall/NAT/SDWAN and/or the application 116). The controller 118 may further be configured to communicate with the event store 128 and/or the correlation module 218. For instance, the controller 118 may store event data in the event store 128. In some examples, the controller 118 may be configured to communicate with one or more of the policies 230 and/or data 232 (e.g., such as to access and/or store policy information in policies 230 and/or data in data 232, as described below). As noted below, the data 232 may store session map(s) generated by the controller 118 and/or one or more components of the controller 118 described in FIG. 2 below.

At "1", the system may initiate session(s). For instance, the system may receive a request from a client device that is located remotely from the network. The request may be to initiate a session (e.g., connect to a VPN, etc.) with a service of a network. The request may be to initiate a session by connecting to a VPN firewall, a ZTNA proxy, and/or other firewall.

As illustrated, a data packet may have multiple "stops" in a "chain of experience" when connecting to an application 116 at a data center 126.

At "2", the system may collect and/or monitor data associated with the session(s). For instance, the system may collect data using the collection module described above. In some examples, the system may monitor the data using the controller 118 and/or monitoring module, described above. For instance, each "stop" in the chain of experience may generate metadata and/or data that is communicated to the controller and/or correlated with other data (e.g., data 232, policies 230, event data, etc.).

At "3", the system may enrich event data. For instance, the system may correlate the data with the identifier(s) of a user of a client device, context data, policy information, and/or any other data described herein. In some examples, the system may enrich (e.g., correlate and/or supplement the data 232, policies 230, event data, etc.) via the correlation module described above.

In this way, the system may consume and correlate data associated with events from multiple sources. Thus, the system may access policies of devices, create and store session map(s) and enrich data (e.g., such as event data), thereby improving and creating greater visibility into remote worker session(s) for network administrators.

Figure 2:
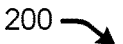
FIG. 2 illustrates a component diagram of an example controller described in FIG. 1.

FIG. 2 illustrates a component diagram of an example monitoring system described in FIG. 1. In some instances, the controller 118 may run on one or more computing devices in, or associated with, the network 102 (e.g., a single device or a system of devices). In some instances, the controller 118 may be integrated as part of a cloud-based management solution (e.g., such as Cisco's Defense Orchestrator).

Generally, the controller 118 may include a programmable controller that manages some or all of the controller activities of the network 102, and manages or monitors the network state using one or more centralized control models.

As illustrated, the controller 118 may include, or run on, one or more hardware processors 202 (processors), one or more devices, configured to execute one or more stored instructions. The processor(s) 202 may comprise one or more cores. Further, the controller 118 may include or be associated with (e.g., communicatively coupled to) one or more network interfaces 204 configured to provide communications with network device(s) 104, the edge device(s) 106 and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDCI's, and so forth. For example, the network interfaces 204 may include devices compatible with any networking protocol.

The controller 118 may also include memory 206, such as computer-readable media, that stores various executable components (e.g., software-based components, firmware-based components, etc.). The memory 206 may generally store components to implement functionality described herein as being performed by the controller 118. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the controller 118.

The controller 118 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various controller functions to occur.

In some examples, the controller 118 may include a collection module 216. In some examples, the system may collect data and/or metadata associated with network traffic, session(s), Firewall packets, Remote Access Virtual Private Network (RA VPN) and Zero Trust Network Access (ZTNA) sessions, Security Assertion Markup Language (SAML) Authentication and Multi-factor Authentication (MFA) events, as well as data from multiple products and disciplines in their own realms and languages.

The controller 118 may include a correlation module 218. In some examples, the correlation module may extract events and data points to create a "session map" (e.g., an end-to-end understanding of the entire session starting from the user on his Personal Computer (PC), laptop or mobile device all the way to the application in the corporate datacenter). In some examples, the correlation module may access the data collected by the collection module and may to track a packet from the source (e.g., a client device), through VPN termination, possible Network Address Translation (NAT) translations, Intrusion Prevention System (IPS) scans, and any other hops on the network, to the final destination. For instance, in this example, the correlation module may correlate the packet with each "stage" of transmission using native components of the transmission, such as IP address, MAC address, identity or session characteristics. In some examples, the correlation module may correlate the data packet with one or more of a username, IP address, MAC address, etc. that is associated with a user and/or the client device.

In some examples, the correlation module may operate in real time. For instance, the digital identity associated with a session and/or user (e.g., username, IP address, MAC address, any information that may be helpful to may correlation between the data packet and the user easier, etc. that is correlated with a session and/or stage of a session) may be injected into a header of a data packet in real time. In some examples, the data packet may comprise a NetFlow data packet. In some examples, the correlation module may place a small piece of metadata (e.g., an identifier, SGT tags, etc.) into an IP6 option, new header, etc. In this example, the identifier can be a key into larger chunk of metadata. Accordingly, the correlation module may add a mapping value into the header of a data packet that can be looked up in key/value store of the system that is correlated with a particular identifier of a user and/or session (e.g., username, IP address, MAC address, timestamps, locations, etc.). Accordingly, the system may inject metadata into packet headers to make it easier for the system to correlate the data packet and the source (e.g., client device).

In some examples, the correlation module may operate in correlation time. In some examples, correlation time may correspond to an event time. In some examples, correlation time corresponds to storing and maintaining a map between the IP address of a particular "digital identity" and a username associated with a user of the client device. In this example, the system may be configured to understand how IP addresses are translated and how identities are translated within the network. Accordingly, data packet(s) and/or sessions flowing from a particular network device and/or firewall, may always include a particular IP address. In this example, the data packets associated with an event and/or pipelines may be routed to go through the correlation module, so the event is enriched with the "digital identity" of that packet flowing by from a first IP address to a second IP address.

The controller 118 may include a monitoring module 220. In some examples, the monitoring module is configured to actively and/or passively monitor data received by the collection module and correlation module. In some examples, the monitoring module may detect network event(s) that occur within the network and/or receive indication(s) of network event(s) from network device(s), firewall(s), etc., within the network. For instance, when a network event is identified and/or received, the monitoring module may perform an analysis. As an example, the monitoring module may detect a remote worker trying to access and/or download malware. In some examples, the monitoring module may receive an indication of the event that looks like "IP 1.1.1.1 accessed 20.20.20.20, 20.20.20.20 is bad". In this example, the monitoring module may begin an analysis, to track the 1.1.1.1 source IP address and determine remote access data (e.g., who had it on that exact time, whether the IP address is dynamic and/or reused, whether the IP address is converted (e.g., AKA NAT, Network Address Translation), timestamps, username, etc. Accordingly, the monitoring module may perform forensics and analysis on the enriched data to determine the username of the user, whether the user is compromised (e.g., had password stolen from phishing scan, etc.), whether the network is compromised, etc. In some examples, the monitoring module may send an indication to the action module to generate an alert for a network administrator.

The controller 118 may include an action module 222. In some examples, the action module may have access to one or more network policies associated with the network. In some examples, the action module may generate and send notification(s) and/or alert(s) to a network administrator in response to detecting a network event. In some examples, the notification(s) and/or alert(s) may comprise indication(s) of the digital identity of the user (e.g., username, context data, indication of compromise, etc.). In some examples, the action module may receive instructions from the network administrator. In some examples, the action module may send instructions, automatically and/or in response to receiving the instructions from the network administrator, to one or more network device(s), firewalls, etc. within the network. In some examples, the instructions may instruct the network device, firewall, etc., to block a connection, update a policy, and/or reconfigure a policy. In some examples, the instruction(s) may be based on accessing context data stored in a database that is correlated (e.g., mapped) to the identity of a user.

In some examples, the action module may send the context data to the firewall. In this example, the firewall may utilize the context data, such that it is no longer blind to context of the communication or packet from a particular user. For example, a Next-Gen Firewall (NGFW) may receive a request to access an application (e.g., such as Facebook) from a remote client device. In this example, the NGFW may receive the digital identity of the user via the request and/or context data from the action module. Accordingly, the NGFW may no longer be blind to permissions associated with the digital identity and may automatically block or allow the connection to Facebook based on the digital identity and/or context data of the user. For instance, where the digital identity indicates the user is associated with a marketing group of a corporation, the NGFW may allow access to the application. However, if the digital identity and/or context data indicates that the user is associated with an engineering group, the NGFW may block the connection to the application.

The controller 118 may further include a data store 224, such as long-term storage, that stores communication libraries 226 for the different communication protocols that the controller 118 is configured to use or perform. Additionally, the data store 224 may include network topology data 228, such as a model representing the layout of the network components in the network 102 and/or data indicating available bandwidth, available CPU, delay between nodes, computing capacity, processor architecture, processor type(s), etc. The data store 224 may store policies 230 that include security data associated with the network, security policies configured for the network, firewall policies, firewall configuration data, network configuration policies, network configuration data, security posture data, and/or compliance policies configured for the network. The data store 224 may store data 232 including metadata, mappings (e.g., session map(s)), identifiers, context data, event data, session data and/or metadata associated with session(s), network data, or any other data and/or information described herein.

FIG. 3 illustrates a flow diagram of an example system 300 for improving troubleshooting, optimizations, threat forensics and analysis within a remote/hybrid network structure associated with the system described in FIGS. 1 and 2. In some instances, the steps of system 300 may be performed by one or more devices (e.g., controller 118, network device(s) 104, etc.) that include one or more processors and one or more non-transitory computer-readable media storing computer-executable instructions that, when executed by the one or more processors, cause the one or more processors to perform operations of system 300.

At 302, the system may receive a request to initiate session(s) associated with a user of the network. For instance, the system may receive a request from a client device that is located remotely from the network. The request may be to initiate a session (e.g., connect to a VPN, etc.) with a service of a network.

At 304, the system may collect first data associated with the session(s), the first data including identifier(s). In some examples, the identifier(s) comprise one or more of a username, metadata, or an IP address. In some examples, the system collects the first data using the collection module described above. In some examples, the first data comprises metadata associated with the user or the one or more sessions.

At 306, the system may correlate the identifier(s) with second data stored in a database. In some examples, the second data comprises one or more of metadata associated with the one or more sessions, context data associated with the user, metadata associated with one or more previous sessions, a location of the device, an account of the user, or a time associated with each of the one or more sessions. In some examples, the system may correlate the identifier(s) with the second data using the correlation module described above.

At 308, the system may receive an indication of a network event, the indication including an identifier of the identifier(s). In some examples, the network event comprises identifying suspicious activity associated with the user. In some examples, the network event is identified and/or detected by the monitoring component described above.

At 310, the system may access, based at least in part on the identifier, third data. In some examples, the third data comprises one or more of context data or metadata associated with one or more identifiers of the user.

At 312, the system may perform an action associated with the network event. In some examples, the action comprises one or more of alerting a network administrator, blocking a connection to one or more services, enabling access to one or more services, or updating one or more policies. In some examples, the action may be performed using the action module described above.

Figure 4:
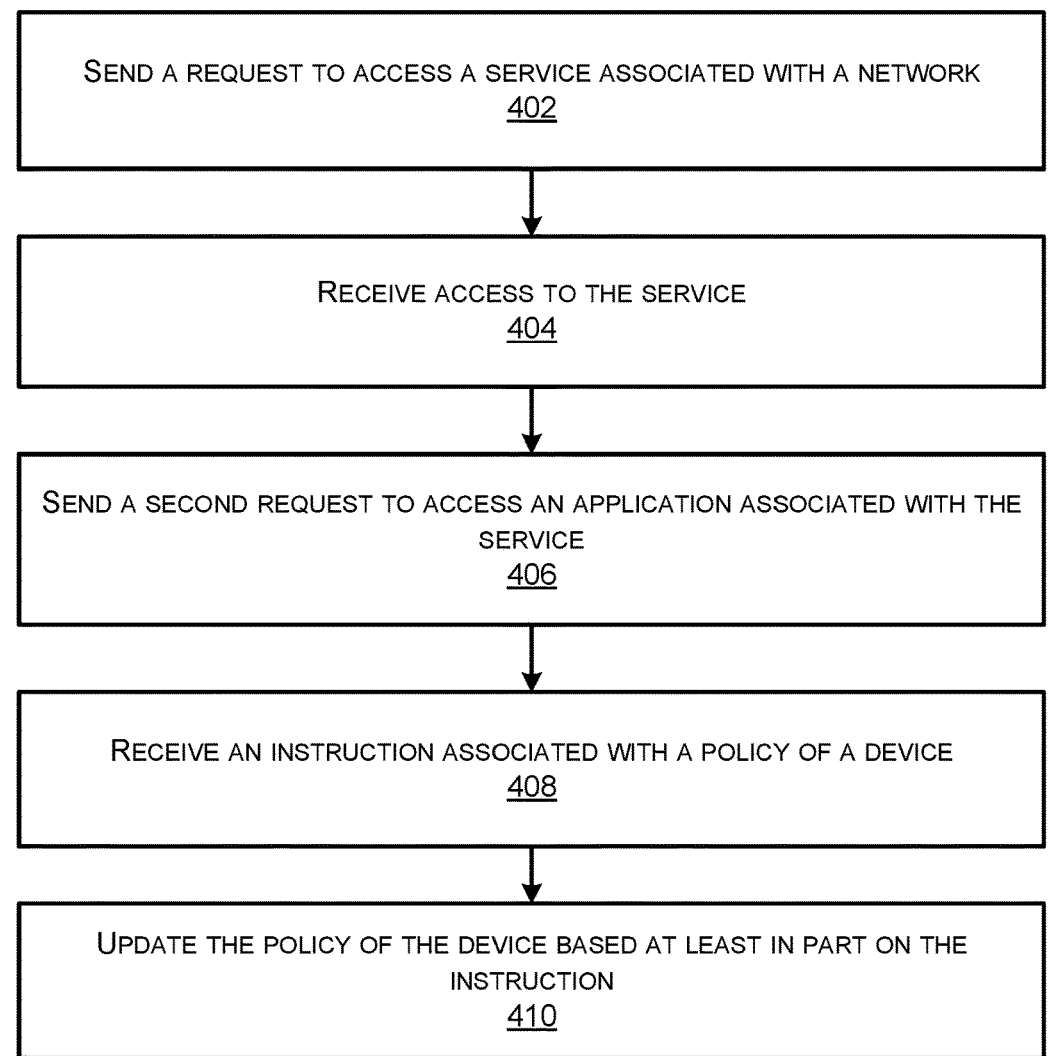
FIG. 4 illustrates a flow diagram of an example method for enabling network administrators to have greater control over network policies within a remote/hybrid network structure associated with the system described in FIGS. 1-3.

FIG. 4 illustrates a flow diagram of an example system 400 for enabling network administrators to have greater control over network policies within a remote/hybrid network structure associated with the system described in FIGS. 1-3. In some instances, the steps of system 400 may be performed by one or more devices (e.g., controller 118, network device(s) 104, etc.) that include one or more processors and one or more non-transitory computer-readable media storing computer-executable instructions that, when executed by the one or more processors, cause the one or more processors to perform operations of system 400.

At 402, the system may send a request to access a service associated with a network. In some examples, the request comprises one or more of a username, an IP address, metadata associated with accessing the service, context data associated with the user, metadata associated with one or more previous sessions, a location of the device, an account of the user, or a time associated with accessing the service.

At 404, the system may receive access to the service. For instance, where the request is to initiate a VPN session, the system may receive access to the service (e.g., the VPN session may be initiated).

At 406, the system may second a second request to access an application associated with the service. In some examples, the second request comprises one or more of a username, an IP address, metadata associated with accessing the application, context data associated with the user, metadata associated with one or more previous sessions, a location of the device, an account of the user, or a time associated with accessing the service.

At 408, the system may receive an instruction associated with a policy of a device. In some examples, the instruction corresponds to blocking a connection to the application or changing permissions associated with accessing the application. In some examples, the policy comprises a firewall policy, a security policy, a network access policy, or any other policy described herein. In some examples, the instruction may be received from a network administrator. For instance, the network administrator may instruct the system to block a connection to the application, such as where the policy indicates a user does not have permission to access the application. In some examples, the instruction is received from a network controller or a network orchestrator within the network.

At 410, the system may update the policy of the device based at least in part on the instruction. For instance, the device may comprise a user device of an end user or a network device within the network. Accordingly, the policy of the device may be updated in real-time based on instruction(s) configured by a firewall, network device, network administrator, etc.

Figure 5:
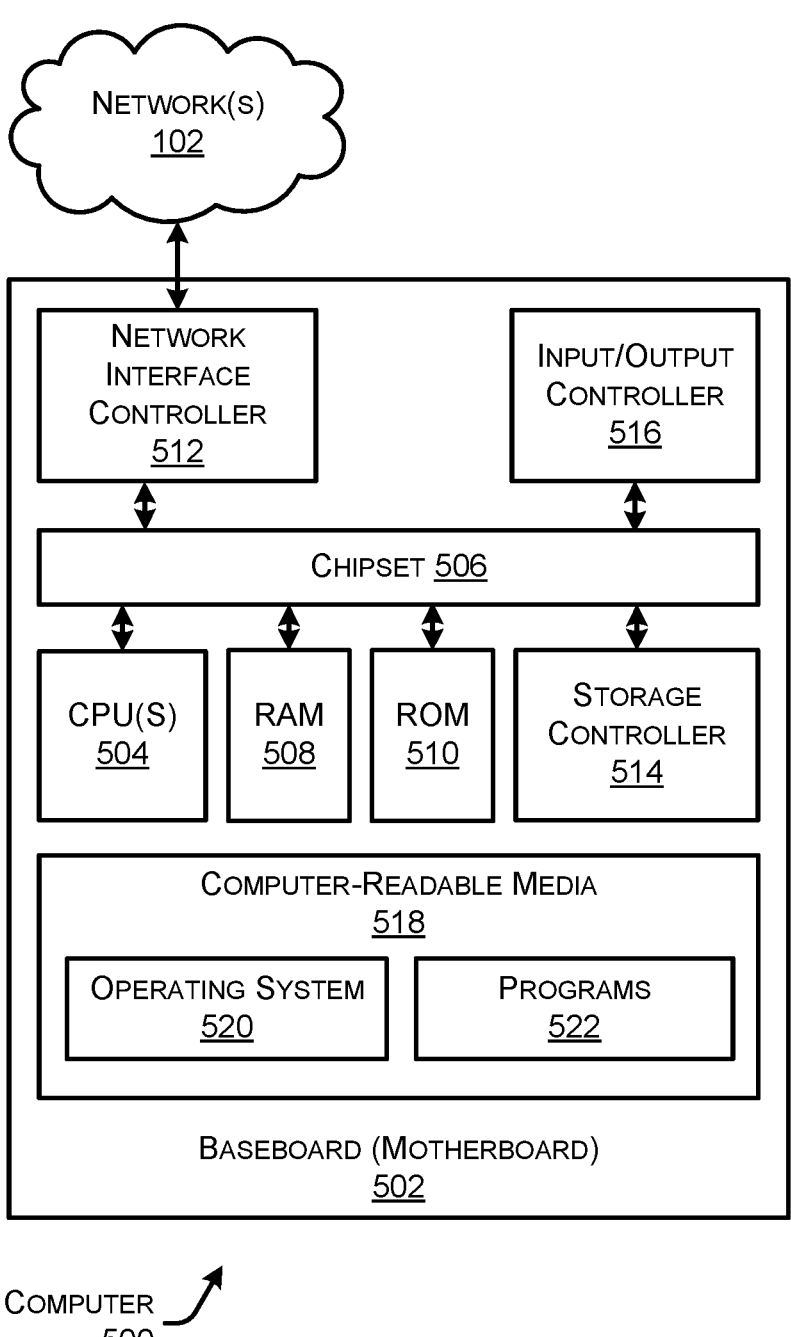
FIG. 5 is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a controller 118 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the controller 118 and/or any components included therein, may be supported by one or more devices similar to computer 500. Stated otherwise, some or all of the operations performed by the controller 118 and/or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a controller 118 and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the controller 118 and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure. For instance, the programs 522 may cause the computer 500 to perform techniques including receiving, from a device within a network, a request to initiate one or more sessions associated with a user of the network; collecting, based at least in part on the request, first data associated with the one or more sessions, the first data including one or more identifiers; correlating the identifier(s) with second data stored in a database of the network; receiving an indication of a network event, the indication including an identifier of the one or more identifiers; accessing, based at least in part on the identifier, third data; and performing, based at least in part on the third data, an action associated with the network event.

Additionally, the programs 522 may cause the computer 500 to perform techniques including sending, from a device within a network, a request for an application to access a service associated with the network; receiving, by the device, access to the service; sending from the device, a second request to access an application associated with the service; receiving, by the device, an instruction associated with a policy of the device; and updating the policy of the device based at least in part on the instruction.

In this way, the computer 500 can identify, contextualize, and correlate multiple sources of remote access information from source to destination for anomaly detection, threat forensics, troubleshooting, and optimizations. Accordingly, the computer may provide meaningful correlation and analytics of data coming from multiple sources in a network, thereby providing interoperability between stream of information within a remote/hybrid network structure.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, from a device, a request to initiate one or more sessions on behalf of a user of a network, the one or more sessions comprising a virtual private network (VPN) session or a zero-trust network access (ZTNA) session;

collecting, based at least in part on the request, first data associated with the one or more sessions, the first data including one or more identifiers including one or more usernames;

collecting second data associated with packets of the one or more sessions, the second data indicating network events associated with the packets occurring at different network hops over which the one or more sessions traverse;

injecting a mapping value into a header of a packet of the packets of the one or more sessions;

correlating, using the one or more identifiers, the first data with second data to generate a session map that represents the network events that occurred at the different network hops, wherein the first data is correlated with the second data using the mapping value; and performing, based at least in part on the session map and a policy associated with the user, an action associated with the one or more sessions.

2. The method of claim 1, further comprising injecting a respective digital identity of a session into one or more headers of the data packets of the one or more sessions.

3. The method of claim 1, wherein the second data comprises one or more of metadata associated with the one or more sessions, context data associated with the user, metadata associated with one or more previous sessions, a location of the device, an account of the user, or a time associated with each of the one or more sessions.

4. The method of claim 1, wherein the first data comprises metadata associated with the user or the one or more sessions.

5. The method of claim 1, wherein the action comprises one or more of alerting a network administrator, blocking a connection to one or more services, enabling access to one or more services, or updating one or more policies.

6. A system comprising:

one or more processors; and one or more non-transitory computer-readable media storing computer-executable instructions that, when executed by the one or more processors, cause the one or more processors to perform operations comprising:

receiving, from a device, a request to initiate one or more sessions on behalf of a user of a network, the one or more sessions comprising a virtual private network (VPN) session or a zero-trust network access (ZTNA) session;

collecting, based at least in part on the request, first data associated with the one or more sessions, the first data including one or more identifiers including one or more usernames;

collecting second data associated with packets of the one or more sessions, the second data indicating network events associated with the packets occurring at different network hops over which the one or more sessions traverse;

injecting a mapping value into a header of a packet of the packets of the one or more sessions;

correlating, using the one or more identifiers, the first data with second data to generate a session map that represents the network events that occurred at the different network hops, wherein the first data is correlated with the second data using the mapping value; and performing, based at least in part on the session map and a policy associated with the user, an action associated with the one or more sessions.

7. The system of claim 6, wherein the one or more identifiers comprise one or more of a username, metadata, or an IP address.

8. The system of claim 6, wherein the second data comprises one or more of metadata associated with the one or more sessions, context data associated with the user, metadata associated with one or more previous sessions, a location of the device, an account of the user, or a time associated with each of the one or more sessions.

9. The system of claim 6, wherein the first data comprises metadata associated with the user or the one or more sessions.

10. The system of claim 6, wherein the action comprises one or more of alerting a network administrator, blocking a connection to one or more services, enabling access to one or more services, or updating one or more policies.

11. The system of claim 6, wherein the network event comprises identifying suspicious activity associated with the user.

12. One or more non-transitory computer-readable media storing computer-readable instructions that, when executed by one or more processors, cause the one or more processors to perform operations comprising:

receiving, from a device, a request to initiate one or more sessions on behalf of a user of a network, the one or more sessions comprising a virtual private network (VPN) session or a zero-trust network access (ZTNA) session;

collecting, based at least in part on the request, first data associated with the one or more sessions, the first data including one or more identifiers including one or more usernames;

collecting second data associated with packets of the one or more sessions, the second data indicating network events associated with the packets occurring at different network hops over which the one or more sessions traverse;

injecting a mapping value into a header of a packet of the packets of the one or more sessions;

correlating, using the one or more identifiers, the first data with second data to generate a session map that represents the network events that occurred at the different network hops, wherein the first data is correlated with the second data using the mapping value; and performing, based at least in part on the session map and a policy associated with the user, an action associated with the one or more sessions.

13. The one or more non-transitory computer-readable media of claim 12, further comprising injecting a respective digital identity of a session into one or more headers of the data packets of the one or more sessions.

14. The one or more non-transitory computer-readable media of claim 12, wherein the second data comprises one or more of metadata associated with the one or more sessions, context data associated with the user, metadata associated with one or more previous sessions, a location of the device, an account of the user, or a time associated with each of the one or more sessions.

15. The one or more non-transitory computer-readable media of claim 12, wherein the first data comprises metadata associated with the user or the one or more sessions.

16. The one or more non-transitory computer-readable media of claim 12, wherein the action comprises one or more of alerting a network administrator, blocking a connection to one or more services, enabling access to one or more services, or updating one or more policies.

* * * * *